US005773756A

United States Patent [19]
DiTullio

[11] Patent Number: 5,773,756
[45] Date of Patent: *Jun. 30, 1998

[54] LIGHTWEIGHT AND DURABLE UTILITY PULL BOX FOR PROTECTING SPLICES AND JUNCTIONS OF UNDERGROUND COAXIAL CABLES, ELECTRICAL WIRES AND OPTICAL FIBERS

[75] Inventor: Robert J. DiTullio, Brookfield, Conn.

[73] Assignee: Cultec, Inc., Brookfield, Conn.

[ * ] Notice: The term of this patent shall not extend beyond the expiration date of Pat. No. 5,419,838.

[21] Appl. No.: 450,613

[22] Filed: May 25, 1995

Related U.S. Application Data

[63] Continuation-in-part of Ser. No. 236,409, May 2, 1994, Pat. No. 5,419,838.

[51] Int. Cl.$^6$ .................................................. H02G 9/00
[52] U.S. Cl. .............................................. 174/37; 52/79.1
[58] Field of Search ........................... 174/37, 38; 52/14, 52/79.1; 220/4.02, 565, 484, 327, 669, 670, 671, 674, 675; 361/622, 641, 724, 826

[56] References Cited

U.S. PATENT DOCUMENTS

| | | | |
|---|---|---|---|
| 1,349,734 | 8/1920 | Riley | 210/155 |
| 1,889,325 | 11/1932 | Whaley | 210/117 |
| 2,996,189 | 8/1961 | Salterbach | 210/155 |
| 3,282,430 | 11/1966 | Kinne | 210/162 |
| 4,319,998 | 3/1982 | Anderson | 210/86 |
| 4,689,145 | 8/1987 | Mathews et al. | 210/170 |
| 4,759,661 | 7/1988 | Nichols et al. | 405/48 |
| 4,919,568 | 4/1990 | Hurley | 405/43 |
| 5,087,151 | 2/1992 | DiTullio | 405/43 |
| 5,129,757 | 7/1992 | Johnson | 405/43 |
| 5,267,122 | 11/1993 | Glover et al. | 361/704 |
| 5,361,930 | 11/1994 | Perry | 220/565 |
| 5,419,838 | 5/1995 | DiTullio | 210/747 |

FOREIGN PATENT DOCUMENTS

| 1245180 | 9/1971 | United Kingdom | 220/565 |
|---|---|---|---|

*Primary Examiner*—Hyung S. Sough
*Attorney, Agent, or Firm*—Ware, Fressola, Van Der Sluys & Adolphson LLP

[57] ABSTRACT

A lightweight and durable utility pull box for storing splices and junctions of underground coaxial cables, electrical wires, and optical fibers, having an elongated main body portion and end walls. The elongated main body portion is made of durable and lightweight plastic material for providing chemical resistance and structural integrity, has sidewalls with an arch-shaped configuration defining an enlarged inner enclosure for storing splices or junctions for electrical, telephone, coaxial cable or optical fiber cable, and has side walls with outer laterally extending strengthening ribs. The end walls cover the ends of the inner enclosure defined by the elongated main body portion. The elongated main body portion has at least one inlet opening for receiving the electrical, telephone, coaxial cable or optical fiber cable for splicing or joining together and storing inside the enlarged inner enclosure.

23 Claims, 8 Drawing Sheets

LIGHTWEIGHT AND DURABLE UTILITY PULL BOX FOR PROTECTING SPLICES AND JUNCTIONS OF UNDERGROUND COAXIAL CABLES, ELECTRICAL WIRES AND OPTICAL FIBERS

This is a continuation-in-part of U.S. application Ser. No. 08/236,409, filed on May 2, 1994, now U.S. Pat. No. 5,419,838 hereby incorporated by reference.

FIELD OF THE INVENTION

The present invention relates generally to a utility pull box, and particularly relates to A utility pull box for storing communication equipment such as an optical network unit, a terminal box, and splices and junctions of underground coaxial cables, electrical wires, and optical fibers.

RELATED PRIOR ART

Utility pull boxes for storing communications equipment including an optical network unit, a terminal box, and splices and junctions of underground coaxial cables, electrical wires, and optical fibers are known in the art. For example, U.S. Pat. No. 5,267,122 in FIG. 12 shows one such underground chamber that is accessible through a hand hole for housing an optical network unit, a splice, and a terminal.

Moreover, FIGS. 10(a) and 10(b) of the instant application show a well-known utility pull box 200 that has a heavy cement lower base 201 and a heavy metal upper lock box 250. As shown in FIG. 10(a), the heavy cement lower base 201 has a lower box portion 202 partially buried in the ground and has a base cover portion 204. As shown in FIG. 10(b), the lower box portion 202 has cement side walls 206, 208, 210, 212, and a wooden floor 213. The cement side wall 206 has an opening 214, and the cement side wall 210 has an opening 216, 218. The openings 214, 216, 218 allow the underground coaxial cables, electrical wires, and optical fiber cables (not shown) to pass into a cavity of the lower box portion 202, where they are joined in a splice or junction (not shown) by a technician. The cavity of the lower box portion 202 stores splices or junctions (not shown) in addition to many extra yards of coaxial cables, electrical wires, and optical fiber cables (not shown). The extra yards are typically necessary so the splice or junction can be pulled out of the lower box portion 202 and away from the pull box 200 so the splice or junction can be worked on by technicians for example in a roadside vehicle, and then replaced in the pull box 200 when the work is done. The base cover portion 204 has an opening therein (not shown) and the heavy metal upper lock box 250 is mounted therein. The heavy metal upper lock box 250 has a metal box 252, a hingedly-connected door 254 and a lock 256 for preventing the swinging door 254 from being opened by unauthorized persons.

One of the important disadvantage of the prior art utility pull boxes is that it is made from concrete, is very heavy, requires heavy machinery such as aerial cranes and many works workers to install it on site, and is typically very costly and time consuming.

SUMMARY OF THE INVENTION

The invention features a molded gallery for storing splices or junctions for electrical, telephone, coaxial cable or optical fiber cable, having an elongated main body portion with side walls and end walls, and being made of durable and lightweight plastic material for providing chemical resistance and structural integrity. The elongated main body portion has an arch-shaped configuration defining an enlarged inner enclosure for storing splices or junctions for electrical, telephone, coaxial cable or optical fiber cable. The side walls are formed with stiffening rib and groove corrugations forming upstanding outer laterally extending strengthening ribs alternating with inwardly protruding grooves. The end walls enclose the ends of the inner enclosure in the elongated main body portion. The elongated main body portion has at least one inlet opening for receiving the electrical, telephone, coaxial cable or optical fiber cable for splicing or joining together and storing inside the enlarged inner enclosure.

Accordingly, a principal object of the present invention is to provide a lightweight and durable utility pull box for storing and protecting splices and junctions of underground coaxial cables, electrical wires, and optical fiber cables.

A principal advantage of the present invention is to provide a utility pull box that is economical and convenience to install.

None of the known patents discussed above suggests apparatus having such an economical and convenient means.

Other objects of the invention will in part be obvious and will in part appear hereinafter.

The invention accordingly comprises the features of construction, combination of elements, and arrangement of parts which will be exemplified in the construction hereinafter set forth, and the scope of the invention will be indicated in the claims.

A DESCRIPTION OF THE DRAWING

For a fuller understanding of the nature and objects of the invention, reference should be made to the following detailed description taken in connection with the accompanying drawings, not in scale, in which:

FIG. 1 shows a cut-away illustration of a utility pull box of th present invention.

FIGS. 2(a), 2(b), 2(c), 2(d), 2(e) are illustrations of the utility pull box, including two perspective views 2(a) and 2(b) and top, side and front views 2(c), (d) (e).

FIGS. 3(a) and (b) are perspective views of another embodiment of the utility pull box of the present invention, respectfully assembled and exploded.

FIG. 4 is a cross-sectional end diagrammatic view of the utility pull box shown in FIG. 3 having a filter frame arranged therein.

FIGS. 5(a), (b) and (c) are diagrammatic views of the filter frame shown in FIG. 4.

Figure 1:
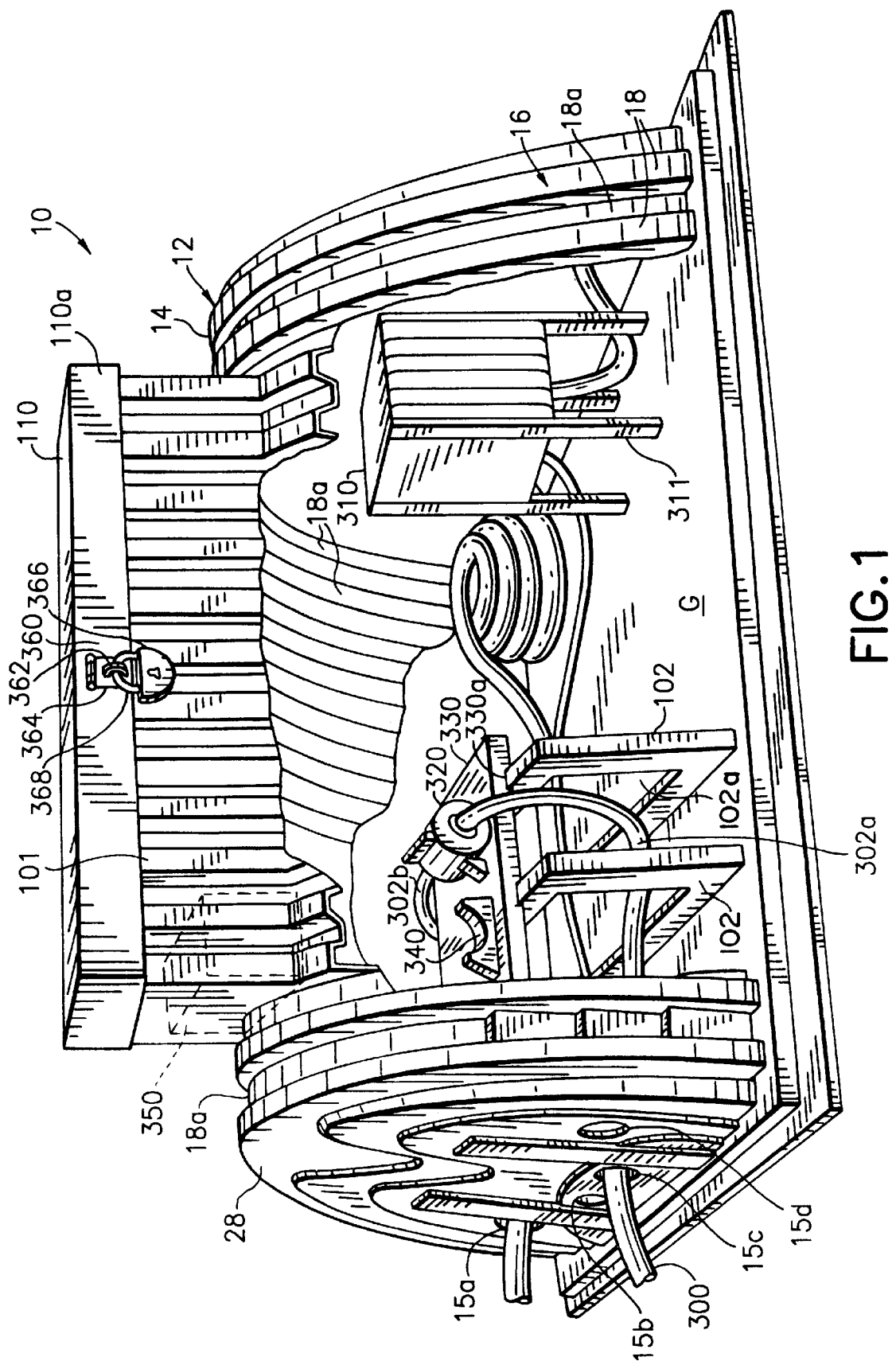
Figure 9A:
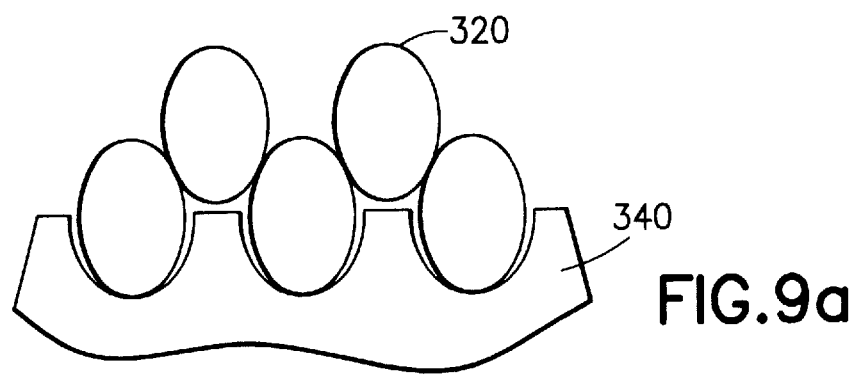
Figure 9B:
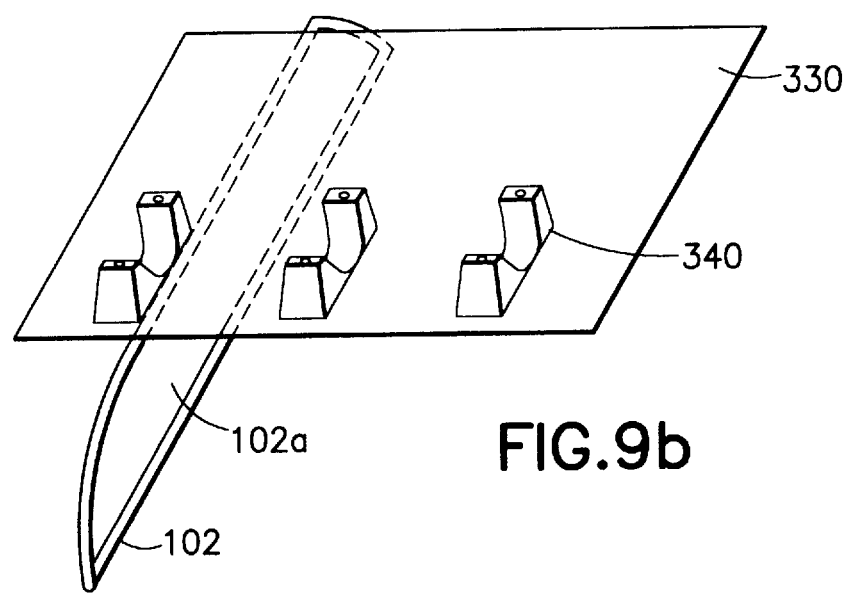
Figure 9C:
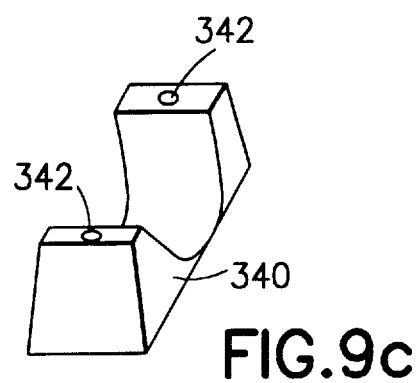

FIGS. 9(a), (b) and (c) show diagrams of the cradle shown in FIG. 1.

Figure 10A:
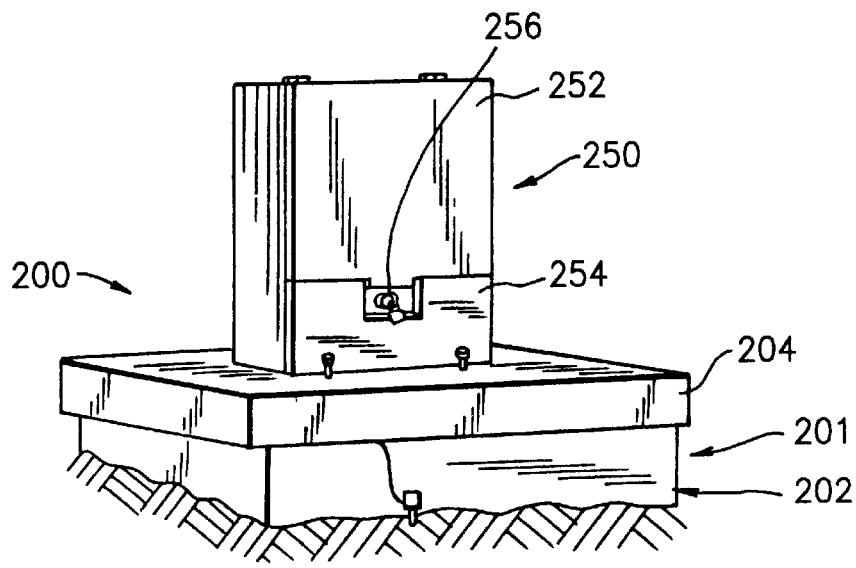
Figure 10B:
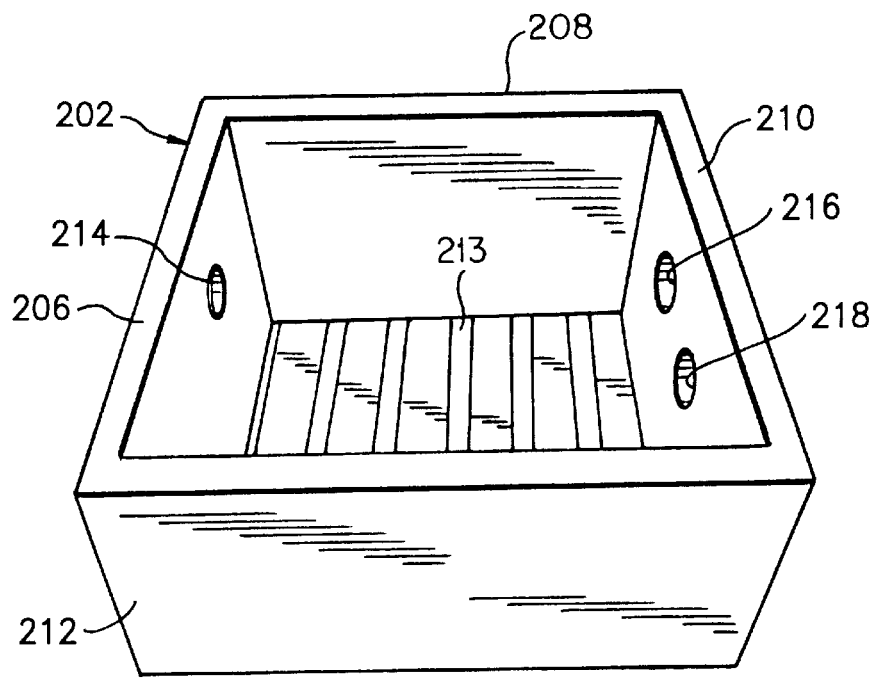

FIGS. 10(a) and 10(b) are perspective views of a utility pull box known in the prior art.

BEST MODE FOR CARRYING OUT THE INVENTION

FIG. 1 shows a gallery described in the aforementioned U.S. application Ser. No. 08/236,409, now U.S. Pat. No.

5,419,838 which can also be used as a utility pull box for storing and protecting communication equipment such as an optical network unit, a terminal and a junction or splice for electrical, telephone, CATV or optical fiber cables. The utility pull box is generally indicated as 10.

In FIG. 1, the utility pull box 10 is formed by an elongated main body portion 12 having an arched-shape configuration defining an enlarged inner enclosure for storing splices or junctions for electrical, telephone, coaxial cable or optical fiber cable. The elongated main body portion 12 has a top domed wall 14 and two downwardly inclined sidewalls 16 with stiffening ribs and groove corrugations forming upstanding, laterally extending strengthening ribs 18 alternating with inwardly protruding grooves spaced longitudinally along the sidewalls 16. The elongated main body portion 12 also has corresponding inner groove corrugations 18a. The upstanding, laterally extending outer strengthening ribs 18 and the corresponding inner strengthening groove corrugations 18a provide structural strength and integrity to the utility pull box 10 for supporting top-down and lateral loads when the utility pull box 10 is buried underground.

The utility pull box 10 is made from high density polyethylene for chemical resistance and structural integrity. It weighs about 100 pounds, and has typical dimensions of about 54 inches wide, about 94 inches long, and about 38 inches deep, and has about 60 cubic feet of storage space, although the scope of the invention is not intended to be limited to such dimensions. Embodiments are envisioned having larger or smaller dimensions with substantially the same proportions. With such dimensions, many such utility pull boxes can be transported in a single standard pickup truck.

As shown in FIGS. 1 and 2, the utility pull box 10 has end walls 28, 30 with rib-like stiffening protuberances 32 and 39 located on the ends of the main body portion 12. As shown, the end wall 28 and protuberance 39 have 4 access openings 15a, 15b, 15c, 15d for receiving underground coaxial cables, electrical wires, and optical fibers indicated as 300 in FIG. 1. The end wall 30 and the protuberance 39 on the other end wall (not shown) of the utility pull box 10 may also have similar access openings (not shown). As shown, the access openings 15a, 15b, 15c, 15d are wide enough for fitting a 4 inch diameter cable. However, the scope of the invention is not intended to be limited to where the access opening are located on the elongated main body portion or any such dimensionality of the access openings 15a, 15b, 15c, 15d or the cable. Embodiments are envisioned having the access openings in the side walls 16 or the top wall 14. The coaxial cables, electrical wires, and optical fibers 300 may carry video signals, telephony signals, electrical, etc.

As shown, the utility pull box 10 has a splice or junction 320 arranged inside the enlarged inner enclosure. Typically, coaxial cables, electrical wires, and optical fibers 300 can only be manufactured to be so long. Therefore, hundreds or thousands of different coaxial cables, electrical wires, and optical fibers 300 may have to be spliced together over great distances to connect the geographic location where a cable, electrical or telephone signal originates to the geographic location where the residential subscriber receives the signal. Because of this, coaxial cables, electrical wires, and optical fibers have to be spliced or joined together in order to carry electric, telephony and video signals over great distances. As shown, the utility pull box 10 has a splice or junction 320 arranged therein which typically connects, for example, one coaxial cable 302a to another coaxial cable 302b, or one electrical wire another electrical wire, or one optical fiber to another optical fiber. Forming such a splice or junction 320 is a highly technical and delicate process, which is typically performed by technicians with highly specialized tools in a roadside vehicle which can be as far as 100 foot away from where the utility pull box 10 is buried in the ground. Because of this, the utility pull box 10 must store about 150 feet of the coaxial cable, electrical wire, or optical fiber 300 for reaching the nearby roadside vehicle. When the splice or junction 320 is complete, it must be carefully arranged back inside the utility pull box 10. The utility pull box 10 protects the splice or junction from undesirable influence caused by adverse weather conditions or mischievous tampering by third parties.

Figure 2A:
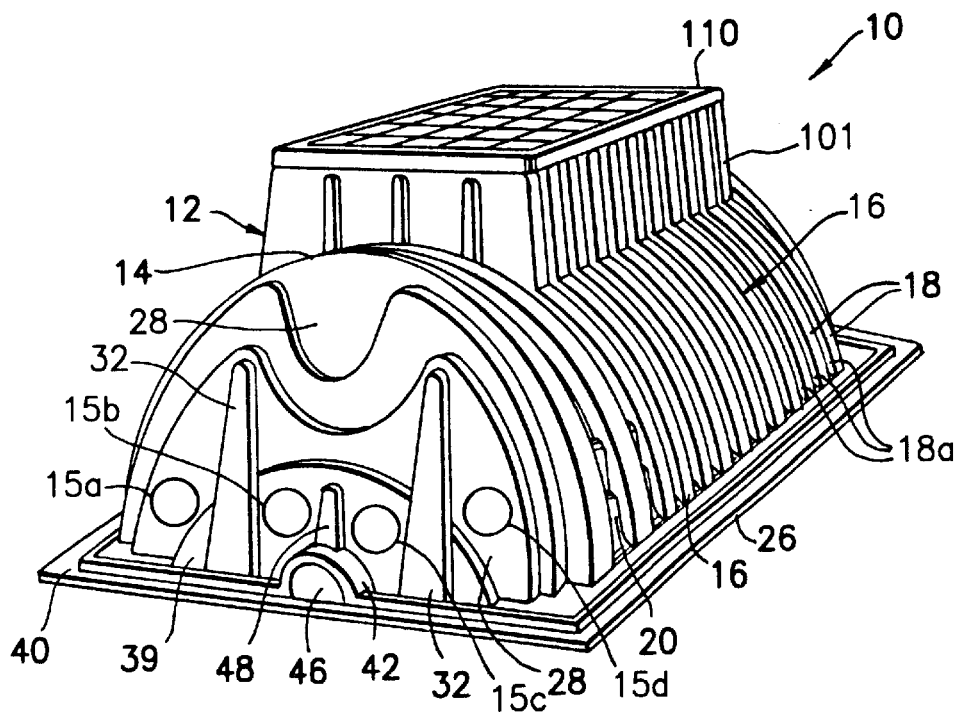

In addition, the utility pull box 10 has a raised top wall 101 with a raised access portal 112 (FIG. 2(a)) on the domed top wall 14. The raised access portal 112 is about 20 inches wide and 46 inches long and large enough for a workman to fit through readily, and can be dimensioned to be large enough so the technician can access the splice or junction 320 from within the enlarged inner enclosure and perform the splice or junction right inside the utility pull box. As discussed above, the scope of the invention is not intended to be limited to these dimensions, because embodiments are envisioned having larger or smaller dimensions with substantially the same proportions. A removable cover 110 is provided for covering the raised access portal 112. As shown in FIG. 1, the removable cover 110 can be hinged on one side. The utility pull box 10 also has a bottom opening for accessing the enlarged inner enclosure, although embodiments are envisioned having a bottom cover, not shown.

As shown in FIG. 1, the utility pull box 10 also has a locking means generally indicated as 360 for locking the removable cover 110. As shown, the locking means 360 includes a staple or bail 362, a hasp 364 and a padlock 366. The staple or bail 362 is secured to the raised upper wall 101. The hasp 364 is connected to a side panel 110a of the removable cover 110 and has an opening for receiving the staple or bail, and the padlock 366 has a bolt member 368 that passes through the staple or bail 362 for locking the removable cover 110. However, the scope of the invention is not intended to be limited to any such particular locking means.

Inside, the utility pull box 10 also includes a splice or junction table 330 mounted on two or three open frames 102, for supporting and elevating the splice or junction 320 thereon. The frame 102 also enhances the overall strength and the structural integrity of the utility pull box 10. The table 330 has corresponding notches generally indicated as 330a on its underside for receiving the frames 102 to prevent the splice or junction table 330 from sliding off the two frames 102. The splice or junction table 330 has at least one splice cradle 340 secured thereto, each for securing the splice or junction to the table 330. The splice cradles 340 are also shown in FIGS. 9(a), (b) and (c) and each have holes 342 for quick ties or security cables (not shown) to secure the splice or junction 320 to the table 330.

Figure 5A:
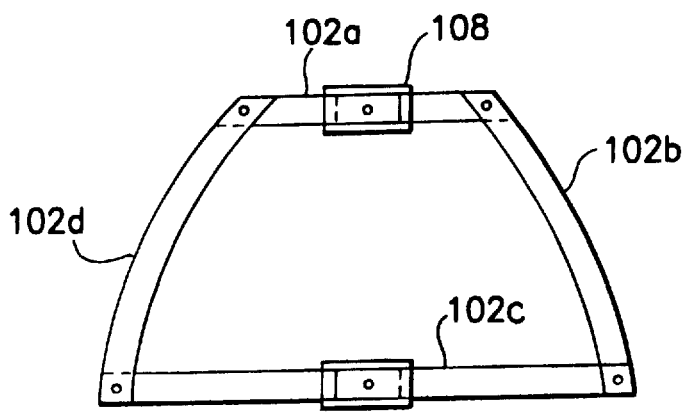
Figure 5B:
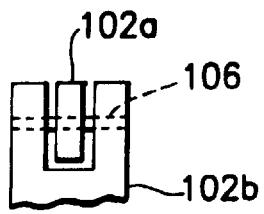
Figure 5C:
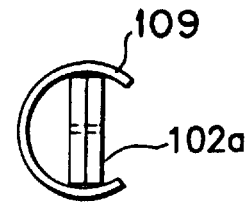

Each open frame 102 is engaged in a respective pair of the laterally extending inner strengthening corrugations 18b. As shown in FIGS. 1 and 5(a), (b) and (c), the open frames 102 can be passed through the raised access portal 112 (FIG. 2(a)). The open frames 102 each have a central opening generally indicated as 102a so the electrical, telephone, coaxial cable or optical fiber cable can pass through each of the frames 102.

Figure 6:
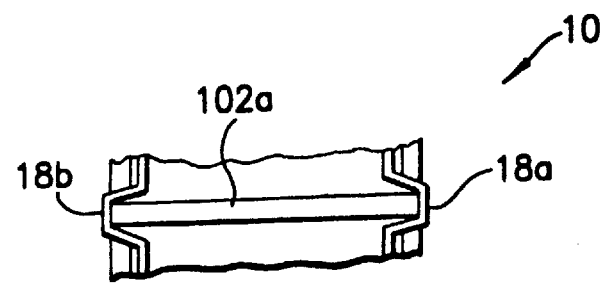
FIG. 6 is a partial, cutaway top view of the filter frame shown in FIG. 4, installed in the pull box.

FIG. 5(a) shows an embodiment in which the open frame 102 is collapsible and which folds up to pass though the raised top portal 112. FIG. 6 best shows how the frame 102 is engaged in the inner corrugations 18a of the side wall 16 of gallery 10. Each open collapsible frame 102 has a hinge and a locking means for holding to prevent the hinge from flexing or bending. The locking means includes a PVC pipe with a 90 degree cut for fitting over and surrounding the hinge and said PVC pipe is turned 90 degrees to prevent said hinge from bending.

As shown in FIG. 1, the utility pull box 10 may have an optical network unit 310 installed inside the enlarged inner enclosure, which separates multiplexed video and telephony signals carried by coaxial cables or optical fibers for delivery to different subscriber residences (not shown). The optical network unit 310 is shown and described in U.S. Pat. No. 5,267,122, which is hereby incorporated by reference. As shown in FIG. 1, the optical network unit 310 is arranged on a pedestal 311 so it is elevated above the ground, generally indicated by the label G. The utility pull box 10 also may have a terminal box 350 mounted on the side wall 16. Typically, the terminal box 350 connects the separate multiplexed video and telephony signals from the optical network unit for delivery to the subscriber residence. In an alternative embodiment not shown, the optical network unit 310 or terminal box 350 can also be arranged on the splice and junction table 330.

Figure 2B:
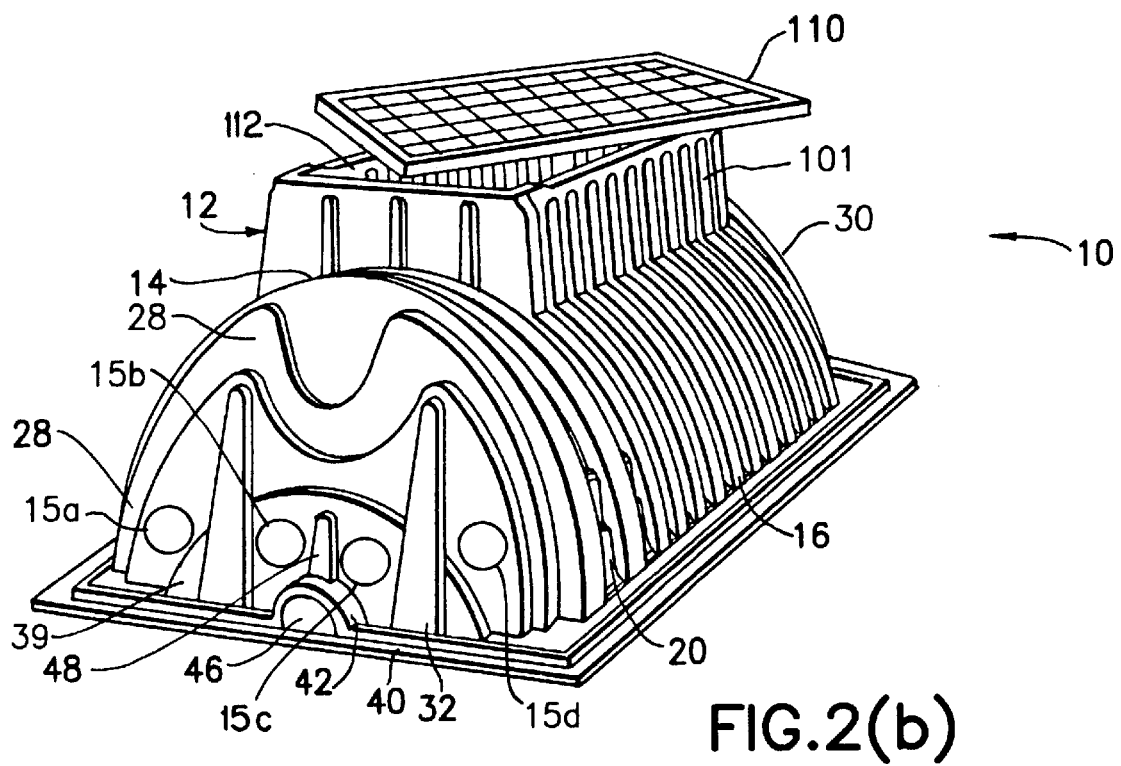
Figure 2C:
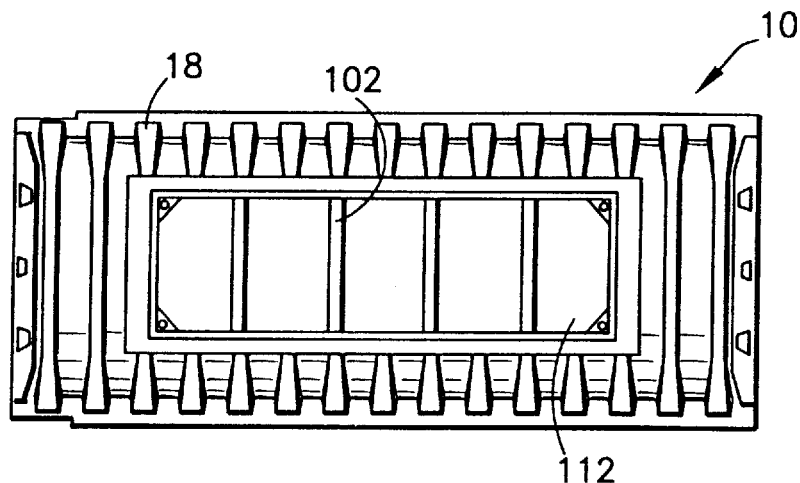
Figure 2D:
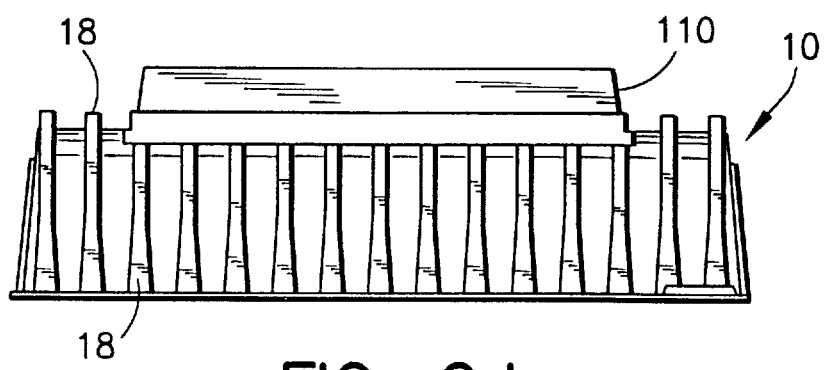
Figure 2E:
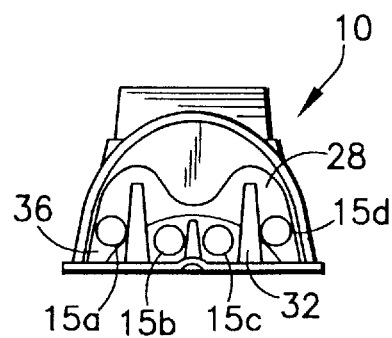

FIGS. 2(a), 2(b), 2(c), 2(d) and 2(e) show the utility pull box substantially similar to the gallery shown in FIGS. 2(a), 2(b) and 2(c) of U.S. application Ser. No. 08/236,409, which described how the gallery shown in FIGS. 2(a), 2(b), 2(c), 2(d) and 2(e) can be adapted as a utility pull box, which is similar in many respects to the galleries shown in FIG. 1 of Pat. No. 5,087,151. The instant application The references numerals used to describe the utility pull box in FIGS. 2(a), 2(b), 2(c), 2(d) and 2(e) substantially correspond to the reference numerals used to describe the gallery in U.S. application Ser. No. 08/236,409, and U.S. Pat. No. 5,087,151, subject to the addition or subtraction of an additional single or double apostrophe. The subject matter of U.S. Pat. No. 5,087,151 is hereby incorporated herein by reference.

Figure 3A:
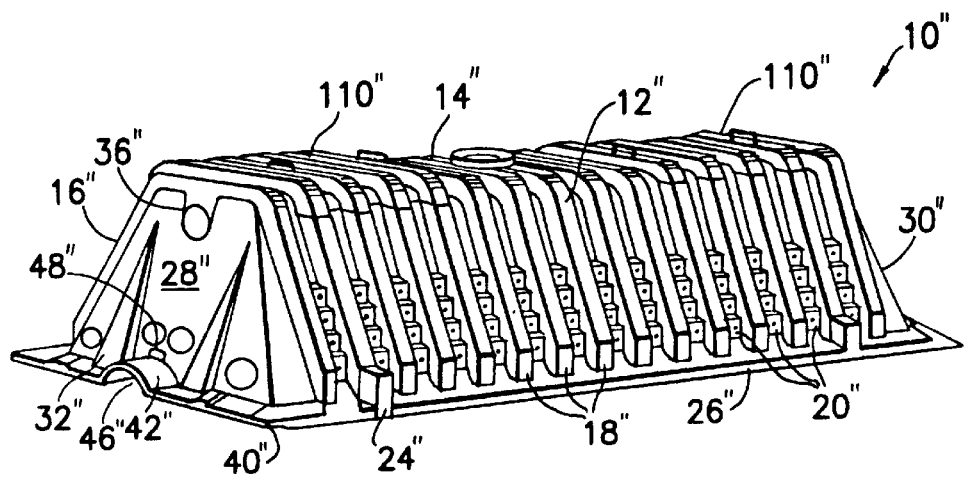
Figure 3B:
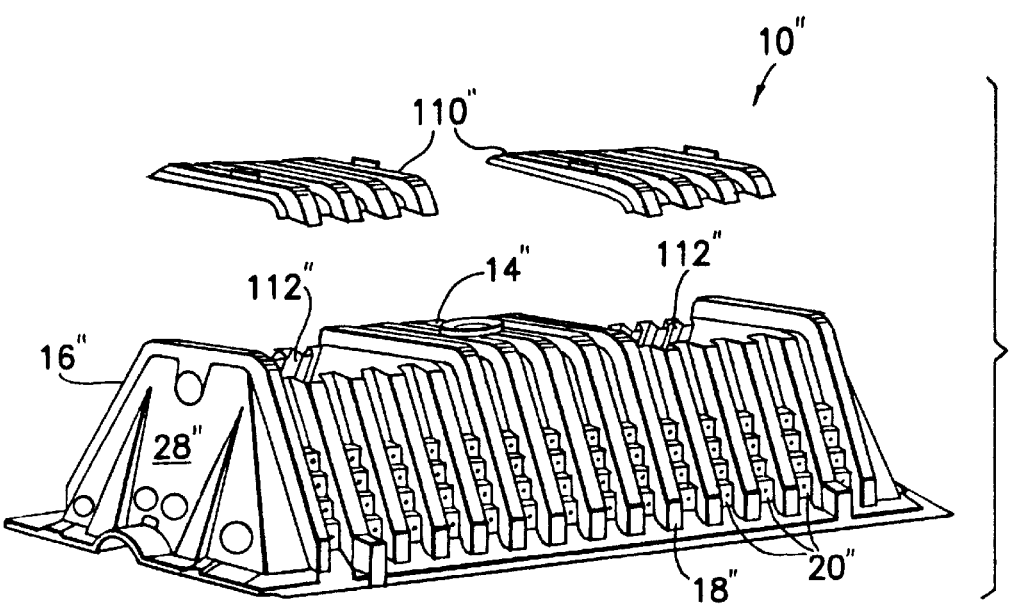
Figure 4:
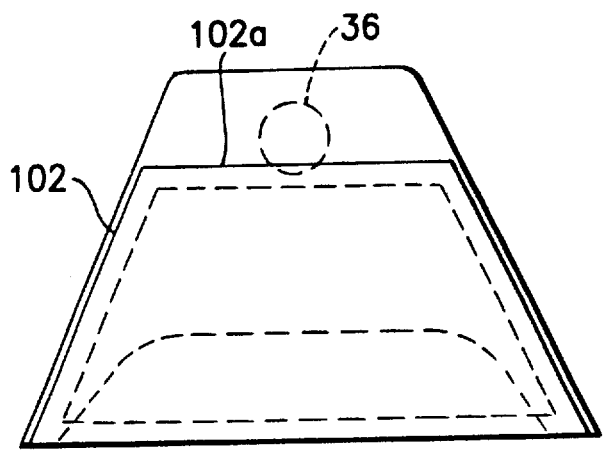

FIGS. 2(a), 2(b), 2(c), 2(d), 2(e) and FIGS. 3(a) and 3(b) show in more detail the utility pull boxes 10 and 10" used for storing splices and junctions of underground coaxial cables, electrical wires, and optical fibers, particularly for telephone company applications. In FIGS. 2(a), 2(b), 2(c), 2(d) and 2(e), the utility pull box 10 forms an enclosure and has an arched or domed shape. The arched shape allows for molding draft and nesting type stacking and provides structural integrity for the gallery. The utility pull box 10" shown in FIGS. 3(a) and 3(b) has a trapezoidal shape. The utility pull boxes 10, 10" can have either an open bottom or a closed bottom depending on the application. In FIGS. 3(a) and (b), the utility pull box 10" has sidewalls 16" which also include nesting lugs 24" to allow the gallery 10" to be nested with other similar utility pull boxes without firmly locking thereto and facilitating separation thereof. In FIGS. 2(a), 2(b), 2(c), 2(d), 2(e), the base portion 26 is designed to support the gallery 10 on the ground. Each end wall 28, 30 has vertically extending structurally supporting raised ribs or struts 32 thereon. The vertically extending structurally supporting raised struts 32 provide structural support for the end walls 28, 30 to increase their load carrying capacity. The flange 40 extends outwardly from the end wall 28 and includes an upstanding protuberance 39 dimensionally sized to mate with associated protuberances on an adjoining gallery (not shown). The protuberance 39 also includes an enlarged centrally located locking lug 42. The other features of the utility pull box 10 are described in detail in Pat. No. 5,087,151, as they pertain to using it as a gallery for storm water management.

The utility pull box 10 also has a bottom opening, for accessing an enlarged inner enclosure best shown in FIG. 1.

Figure 7:
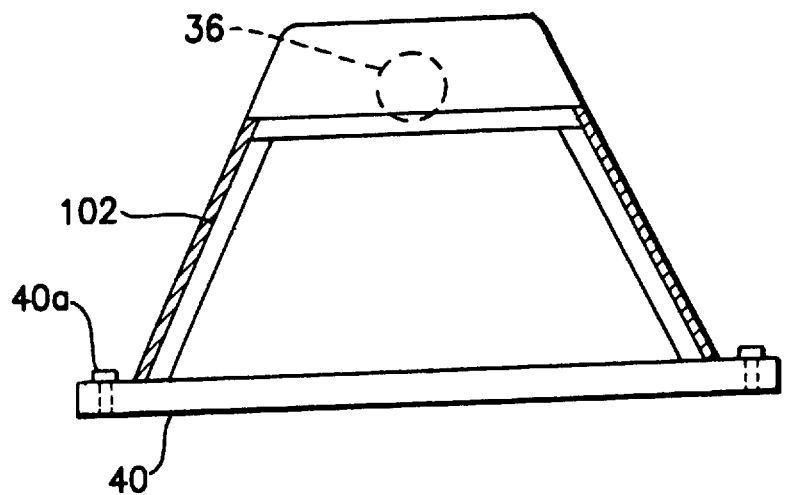
FIG. 7 is a cross-sectional diagrammatic end view of the utility pull box shown in FIGS. 3(a) and 3(b) having a filter frame arranged therein.
Figure 8:
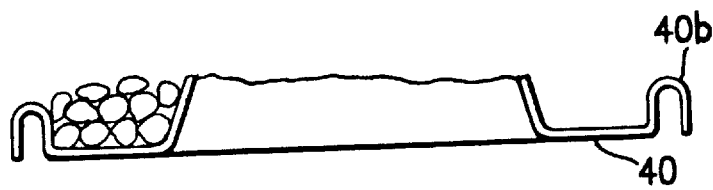
FIG. 8 is a fragmentary cross-sectional end elevation vie of another embodiment of the utility pull box.

In other embodiments shown in FIGS. 7 and 8, the flange 40 has an opening in at least one corner for receiving a set screw 40a for securing the utility pull box 10 to another surface (not shown). As shown in FIG. 8, the flange 40 has a ribbed outer rim 40b for retaining crushed stone piled thereon for anchoring said gallery in place.

It will thus be seen that the objects set forth above, and those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A gallery for storing splices or junctions for electrical, telephone, coaxial cable or optical fiber cable, comprising:

an elongated main body portion made of durable and lightweight plastic material for providing chemical resistance and structural integrity, having an arch-shaped configuration defining an enlarged inner enclosure for storing communication equipment such as a splice or junction for electrical, telephone, coaxial cable or optical fiber cable, having side walls formed with stiffening ribs and groove corrugations forming upstanding outer laterally extending strengthening ribs alternating with inwardly protruding grooves, and having end walls enclosing an end of the enclosure in the elongated main body portion; and means for forming at least one inlet opening in the elongated main body portion for receiving the electrical, telephone, coaxial cable or optical fiber cable for splicing or joining together and storing inside the enlarged inner enclosure of the elongated main body portion;

wherein said gallery further comprises a raised top wall having four sides defining a raised top manhole portal to accommodate a person's body for accessing the communication equipment or connection in the enlarged inner enclosure, the raised top wall having stiffening ribs and groove corrugations forming columnar upstanding outer laterally extending strengthening ribs alternating with inwardly protruding grooves, and wherein said gallery also further comprises a removable cover dimensioned to close the raised top manhole portal and lockable in place to close securely the raised top manhole portal.

2. A gallery according to claim 1, wherein said end walls have strengthening corrugations.

3. A gallery according to claim 1, wherein said side walls have inwardly extending strengthening corrugations.

4. A gallery according to claim 1, wherein the gallery further comprises at least two open frames, each engaging in a respective pair of inwardly extending strengthening corrugations.

5. A gallery according to claim 1, wherein said gallery has a flange around its base for receiving gravel to secure the gallery.

6. A gallery according to claim 1, wherein the gallery is shaped so as to be stackable with other correspondingly-shaped galleries for conveniently and economically transporting a multiplicity on the back of a single standard pickup truck.

7. A gallery according to claim 1, wherein said means for forming at least one inlet opening includes an inlet opening in at least one of said end walls.

8. A gallery according to claim 1, wherein said means for forming at least one inlet opening includes an inlet opening in said side walls.

9. A gallery for storing splices or junctions for electrical, telephone, coaxial cable or optical fiber cable, comprising:

an elongated main body portion made of durable and lightweight plastic material for providing chemical resistance and structural integrity, having an arch-shaped configuration defining an enlarged inner enclosure for storing communication equipment such as a splice or junction for electrical telephone, coaxial cable or optical fiber cable, having side walls formed with stiffening ribs and groove corrugations forming upstanding outer laterally extending strengthening ribs alternating with inwardly protruding grooves, and having end walls enclosing an end of the enclosure in the elongated main body portion; and means for forming at least one inlet opening in the elongated main body portion for receiving the electrical, telephone, coaxial cable or optical fiber cable for splicing or joining together and storing inside the enlarged inner enclosure of the elongated main body portion;

wherein the gallery further comprises at least two open frames, each engaging in a respective pair of inwardly extending strengthening corrugations; and wherein the gallery further comprises a splice or junction table overlying said at least two open frames for supporting and elevating at least one splice or junction thereon.

10. A gallery according to claim 9, wherein said gallery further comprises a raised top wall having four sides defining a raised top portal for reaching into and accessing the splice or junction in the enlarged inner enclosure, and a removable cover dimensioned to close said raised top portal.

11. A gallery according to claim 10, wherein said removable cover is hinged.

12. A gallery according to claim 9, wherein said splice or junction table has corresponding notches on its underside for engaging said at least two open frames to prevent the splice or junction table from sliding off said open frames.

13. A gallery according to claim 9, wherein said splice or junction table has at least one splice cradle secured thereto, each for securing a splice or junction to the splice or junction table.

14. A gallery according to claim 13, wherein said at least one splice cradle has holes for anchoring ties or security cables.

15. A gallery according to claim 9, wherein said at least two open frames have a central opening so said electrical, telephone, coaxial cable or optical fiber cable can pass through said at least two open frames.

16. A gallery according to claim 15, wherein said at least two open frames are hingeably collapsible for passing through a raised top access portal.

17. A gallery according to claim 16, wherein said at least two open frames have a hinge and a locking means for holding to prevent the hinge from flexing.

18. A gallery according to claim 17, wherein said locking means is a PVC pipe with a 90 degree cut for fitting over and surrounding the hinge and said PVC pipe is turned 90 degrees to prevent said hinge from bending.

19. A gallery according to claim 9, wherein said gallery has a bottom opening for accessing the enlarged inner enclosure.

20. A gallery for storing splices or functions for electrical, telephone, coaxial cable or optical fiber cable, comprising:

an elongated main body portion made of durable and lightweight plastic material for providing chemical resistance and structural integrity, having an arch-shaped configuration defining an enlarged inner enclosure for storing communication equipment such as a splice or junction for electrical, telephone, coaxial cable or optical fiber cable, having side walls formed with stiffening ribs and groove corrugations forming upstanding outer laterally extending strengthening ribs alternating with inwardly protruding grooves, and having end walls enclosing an end of the enclosure in the elongated main body portion; and means for forming at least one inlet opening in the elongated main body portion for receiving the electrical, telephone, coaxial cable or optical fiber cable for splicing or joining together and storing inside the enlarged inner enclosure of the elongated main body portion;

wherein the gallery further comprises an optical network unit arranged inside the enlarged inner enclosure, for separating multiplexed video and telephony signals for delivery to subscriber residences.

21. A gallery according to claim 20, wherein said optical network unit is arranged on a pedestal.

22. A gallery for storing splices or junctions for electrical, telephone, coaxial cable or optical fiber cable, comprising:

an elongated main body portion made of durable and lightweight plastic material for providing chemical resistance and structural integrity, having an arch-shaped configuration defining an enlarged inner enclosure for storing communication equipment such as a splice or junction for electrical, telephone, coaxial cable or optical fiber cable, having side walls formed with stiffening ribs and groove corrugations forming upstanding outer laterally extending strengthening ribs alternating with inwardly protruding grooves, and having end walls enclosing an end of the enclosure in the elongated main body portion; and means for forming at least one inlet opening in the elongated main body portion for receiving the electrical, telephone, coaxial cable or optical fiber cable for splicing or joining together and storing inside the enlarged inner enclosure of the elongated main body portion;

wherein said gallery further comprises a terminal box mounted inside the elongated main body portion.

23. A gallery for storing splices or functions for electrical, telephone, coaxial cable or optical fiber cable, comprising:

an elongated main body portion made of durable and lightweight plastic material for providing chemical resistance and structural integrity, having an arch-shaped configuration defining an enlarged inner enclosure for storing communication equipment or connection such as a splice or junction for electrical, telephone, coaxial cable or optical fiber cable, having side walls formed with stiffening ribs and groove corrugations forming upstanding outer laterally extending strengthening ribs alternating with inwardly protruding grooves, and having end walls enclosing an end of the enclosure in the elongated main body portion; and means for forming at least one inlet opening in the elongated main body portion for receiving the electrical, telephone, coaxial cable or optical fiber cable for splicing or joining together and storing inside the enlarged inner enclosure of the elongated main body portion, wherein said gallery further comprises a raised top wall having four sides defining a raised top manhole portal to accommodate a person's body for accessing the communication equipment or connection in the enlarged inner enclosure, and a removable cover dimensioned to close the raised top manhole portal, wherein the gallery further comprises at least two open frames, wherein said elongated main body portion has a trapezoidal shape in cross-section, and wherein the at least two open frames have a corresponding trapezoidal shape.

* * * * *

UNITED STATES PATENT AND TRADEMARK OFFICE
CERTIFICATE OF CORRECTION

PATENT NO. : 5,773,756
DATED : June 30, 1998
INVENTOR(S) : DiTullio

It is certified that error appears in the above-identified patent and that said Letters Patent is hereby corrected as shown below:

Column 2, line 38 delete "th present invention" and insert

--the present invention--

Column 2, line 41 delete "2(c), (d) (e)" and insert

--2(c), (d), (e)--

Column 2, line 56 delete "elevation vie" and insert --elevation view--

Column 7, claim 9, line 14 delete "junction for electrical telephone"

and insert --junction for electrical, telephone--

Column 8, claim 20, line 1 delete "functions for electrical" and insert

--junctions for electrical,--

Signed and Sealed this

Twenty-ninth Day of December, 1998

Attest:

BRUCE LEHMAN

*Attesting Officer*    *Commissioner of Patents and Trademarks*